US006407863B1

(12) United States Patent
Archambault et al.

(10) Patent No.: US 6,407,863 B1
(45) Date of Patent: Jun. 18, 2002

(54) DUAL TRANSMISSION BAND INTERFERENCE FILTER

(75) Inventors: Jean Luc Archambault, Severna Park; Vladimir Pelekhaty, Baltimore, both of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/551,141

(22) Filed: Apr. 17, 2000

Related U.S. Application Data
(60) Provisional application No. 60/130,212, filed on Apr. 20, 1999.

(51) Int. Cl.[7] .............................. G02B 5/28; G02B 5/26
(52) U.S. Cl. ....................................... 359/589; 359/588
(58) Field of Search ................................ 359/589, 588, 359/586, 580

(56) References Cited

U.S. PATENT DOCUMENTS

| 4,373,782 A | 2/1983 | Thelen ....................... 350/166 |
| 4,747,666 A | 5/1988 | Ishida ........................ 350/164 |
| 4,958,892 A | 9/1990 | Jannson et al. .............. 350/3.6 |
| 5,410,431 A | 4/1995 | Southwell .................... 359/580 |
| 5,719,989 A | 2/1998 | Cushing ...................... 359/589 |
| 5,926,317 A * | 7/1999 | Cushing ...................... 359/588 |
| 6,011,652 A | 1/2000 | Cushing ...................... 359/588 |

FOREIGN PATENT DOCUMENTS

| FR | 2658619 A | 8/1991 | ........................ 5/8 |

\* cited by examiner

*Primary Examiner*—Jon Henry
(74) *Attorney, Agent, or Firm*—David L. Soltz

(57) ABSTRACT

A dual-band optical filter is disclosed which has two transmission bands. The first band is relatively narrow (about 1 nm) and encompasses a wavelength of about 1550 nm, while the second band is relatively broad (greater than 50 nm) to transmit wavelengths in a range of 1300–1400 nm. Accordingly, the filter can be used in wavelength division multiplexed communication systems to simultaneously select a payload channel having a wavelength of approximately 1550 nm, and a 1310 nm service channel.

15 Claims, 9 Drawing Sheets

|        | H | L | H₁ | L | H | ... | H₁  | L   | H |
|--------|---|---|----|---|---|-----|-----|-----|---|
| LAYER#:| 1 | 2 | 3  | 4 | 5 | ... | Q-2 | Q-1 | Q |

DUAL TRANSMISSION BAND INTERFERENCE FILTER

The present application claims the benefit of U.S. Provision Patent Application Serial No. 60/130,212, filed Apr. 20, 1999.

FIELD OF THE INVENTION

The present invention relates generally to optical interference filters and more particularly to a dual band optical interference filter capable of transmitting optical channels within a first and second passbands.

BACKGROUND OF THE INVENTION

Optical interference filters rely on principles of interference that modify the intensities of the reflected light incident on a surface. A familiar example of interference is the colors created when light reflects from a thin layer of oil floating on water. Briefly stated, by modifying the interface of a substance and its environment with a third material, reflectivity of the substance can be significantly altered. This principle is used in the fabrication of optical interference filters. These filters can be used as one of, or as the main filtering element in optical add/drop multiplexers employed in optical communication systems to select one or more channels from a transmission signal.

In its most simple form, an optical interference filter includes a cavity which is comprised of two partial reflectors (or mirrors) separated by a spacer. The number of spacers determines the number of cavities of the filter. Each partial reflector, also referred to as a quarter-wave stack, is typically constructed by depositing alternating layers of high and low refractive index dielectric materials upon a substrate where each layer has an optical thickness (defined as: physical thickness x refractive index) of a quarter wave ($\lambda/4$) (or odd multiple of a quarter wave) at the desired wavelength $\lambda_0$ of the filter. Exemplary high and low refractive index dielectric materials are $TiO_2$, $Ta_2O_5$ and $SiO_2$, respectively. The spacer is typically a half-wave (or multiple half-wave) layer of low refractive index material (e.g., $SiO_2$). An interference filter has an associated transmission characteristic which is a function of the reflectance of the layers of high and low index materials associated with the stack.

In many applications, optical interference filters are constructed using multiple cavities. Typically, cavities are deposited on top of other cavities, with a quarter-wave layer of low index material therebetween. Multicavity filters produce transmission a spectra that are preferred in optical communication systems where steep slopes and square passbands are needed to select one or more optical channels. The larger the number of cavities employed, the steeper the slope of the transmission bandwidth associated with a particular filter. The transmission bandwidth of a multicavity filter is wider as compared with the transmission bandwidth associated with a single cavity filter.

FIG. 1 illustrates an exemplary transmission spectrum for a mirror comprising a plurality of high/low refractive index dielectric layers. The mirror exhibits high reflectivity at a stopband centered at $\lambda_0$ and rippled sidelobes including points A, B and C.

FIG. 2 is an exemplary transmission spectrum for a single cavity optical interference filter utilizing a pair of stacks each having the transmission spectrum shown in FIG. 1. As can be seen in FIG. 2 the transmission response is acceptable at wavelength $\lambda_0$ (approximately 1550 nm). However, the response at wavelength $\lambda_1$ (approximately 1310 nm) falls on the sidelobe and/or within the ripple band of the transmission spectrum, thereby making transmission of a particular wavelength in this range unreliable. More specifically, the single cavity interference filter produces high transmittance at wavelengths referenced at points A and B, but also produces relatively low transmittance as referenced at point C. Thus, transmission at a first wavelength $\lambda_0$ may be reliable while transmission for wavelength $\lambda_1$ within the ripple band or sidelobe slope are subject to variations in the transmission characteristic. This is also true for wavelengths in the 1625 nm range. FIG. 2 demonstrates that interference filters typically provide a single reliable transmission band.

As noted above, optical systems can utilize one or more interference filters to select particular channels from a transmission signal. For example, a first filter may be used to select a pay-load channel associated with voice and/or data transmission in the 1.5 $\mu$m range and a second filter is used to select a service channel in the 1.3 $\mu$m or 1.6 $\mu$m range which carries system level and/or network monitoring information. The use of two separate filters, however, has several disadvantages. First, it increases overall system cost since it requires the manufacture and installation of two individual components. Secondly, optical networks typically have a predetermined loss budget, if exceeded, can compromise signal integrity. Each component, in this case an optical filter, contributes some loss to the overall network. By using two separate filters to select a payload channel and a service channel, each filter negatively impacts a network's loss budget.

Thus, there is a need for a filtering element used with optical communication systems capable of selecting a first and a second optical passbands. There is a further need to provide such a filtering element which reliably selects at least one wavelength corresponding to a payload channel as well as a wavelength corresponding to a service channel within an optical network.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

The interference filter in accordance with the present invention transmits a narrow (≈1 nm wide) wavelength band around a first center wavelength $\lambda_0$ (e.g., $\lambda_0 \approx 1550$ nm) along with a broader (≈20 nm wide) wavelength band around a second center wavelength $\lambda_1$, (e.g., $\lambda_1 \approx 1310$ nm). This can best be explained with reference to a multilayer dielectric mirror with sufficiently high and broad transmission band around wavelength $\lambda_1$. The high transmission peaks (referenced at points A and B in FIG. 1) are positioned within the passband of the multilayer dielectric mirror corresponding to wavelength $\lambda_1$ which is the center wavelength of the second broad band. If the first high transmission peak is chosen to coincide with $\lambda_1$ (i.e., peak referenced at A) the following equations can be used to determine the parameters of the basic multilayer dielectric mirror:

$$\frac{n_H(\lambda_1)}{n_L(\lambda_1)} = \frac{1+r}{1-r} \quad (1)$$

$$r = \sqrt{1 - \left(\frac{\sin\left(\frac{\pi}{2}\frac{\lambda_0}{\lambda_1}\right)}{\sin\left(\frac{\pi}{2}\frac{(q-1)}{(q+1)}\right)}\right)^2} \quad (2)$$

where $n_H(\lambda_1)$ and $n_L(\lambda_1)$ are high and low refractive indices at $\lambda_1$; r is the absolute value of the magnitude Fresnel reflection coefficient for the boundary between the high and low index layers; and q is the number of layers in the stack or mirror. Equations (1) and (2) can be satisfied, for example, with $n_H(\lambda_1) \approx 2.05$ (Ta$_5$O$_5$), $n_L(\lambda_1) \approx 1.44$ (SiO$_2$), $\lambda_0 = 1550$ nm, $\lambda_1 = 1310$ nm, and q=13. In this manner, for a wavelength $\lambda_0$ (≈1550 nm), broad band transmission is achieved for a wavelength centered at $\lambda_1$ (≈1310 nm) as well as narrow band transmission at wavelength $\lambda_0$.

Figure 3A:
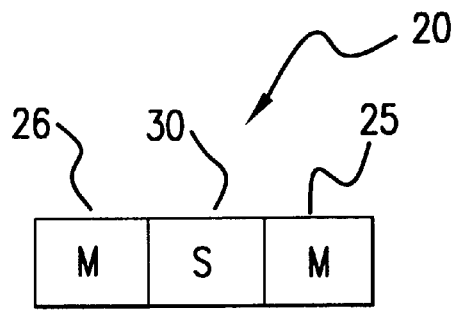
FIG. 3(a) illustrates a single-cavity interference filter consistent with the present invention.
Figure 3B:
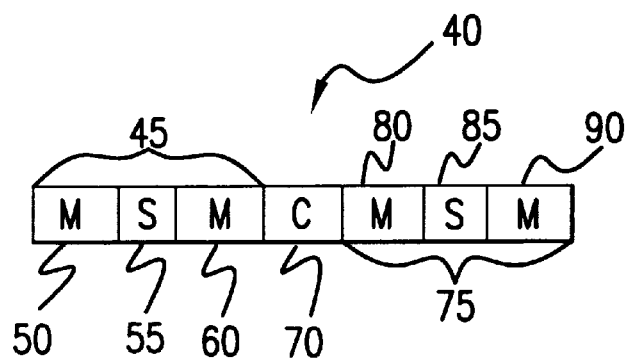
FIG. 3(b) illustrates a dual-cavity interference filter consistent with the present invention.
Figure 3C:
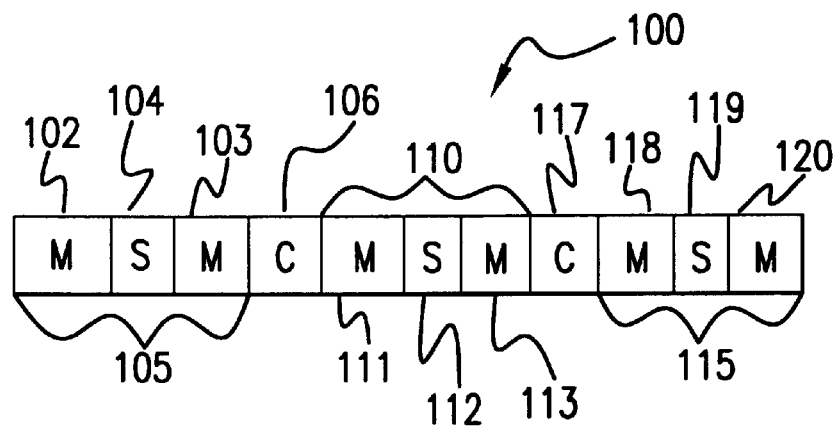
FIG. 3(c) illustrates a three cavity interference filter consistent with the present invention.

Turning to the drawings in which like reference characters indicate the same or similar elements in each of the several views, FIG. 3(a) schematically describes a single-cavity interference filter in accordance with the present invention comprising a spacer 30 interposed between a first and second mirrors 25 and 26. FIG. 3(b) illustrates a dual cavity interference filter 40 having a coupling layer 70 interposed between a first cavity 45 and a second cavity 75. Coupling layer 70 can be, for example, a low index material having a quarter wave optical thickness. First cavity 45 includes mirrors 50 and 60 separated by spacer 55. Second cavity 75 includes mirrors 80 and 90 separated by spacer 85. Similarly, FIG. 3(c) illustrates a triple cavity interference filter 100 having a first cavity 105, a second cavity 110 and a third cavity 115. First coupling layer 106 is positioned between first cavity 105 and second cavity 110. Second coupling layer 117 is positioned between second cavity 110 and third cavity 115. First cavity 105 comprises mirrors 102 and 103 separated by spacer 104. Second cavity 110 includes mirrors 111 and 113 separated by spacer 112. Third cavity 115 includes mirrors 118 and 120 separated by spacer 119.

Figure 4:
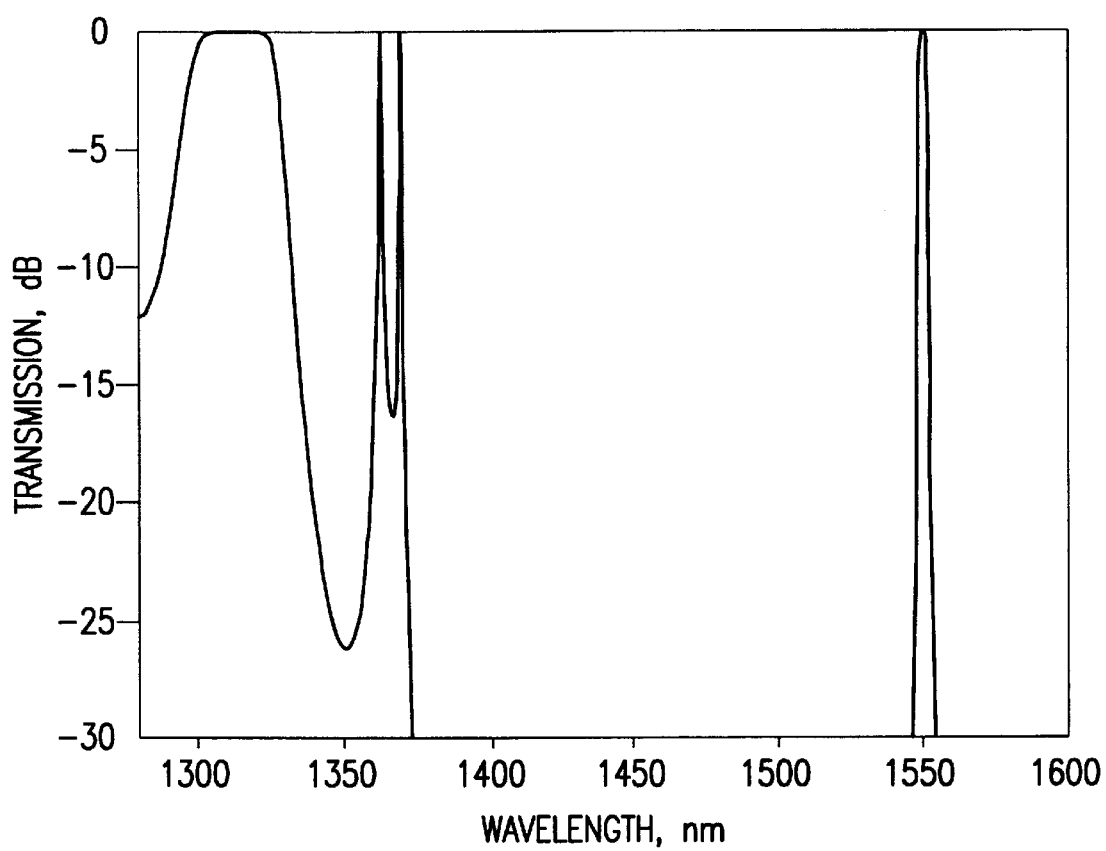
FIG. 4 illustrate transmission characteristic of an exemplary triple cavity interference filter having a narrow transmission band at a wavelength around 1550 nm and a broad transmission band at a wavelength around 1310 nm.

FIG. 4 illustrates a transmission characteristic of an exemplary triple cavity interference filter having a narrow transmission band at wavelength $\lambda_0$ (around 1550 nm) and a broad transmission band at wavelength $\lambda_1$ (around 1310 nm).

The interference filter described above has the properties which allow it to transmit both a narrow band centered at wavelength $\lambda_0$ (≈1550 nm) and a broad band at wavelength $\lambda_1$ (≈1310 nm). However, this embodiment transmits the bands for a particular wavelength $\lambda_0$. If a different wavelength, for example $\lambda_0 + \Delta$, is selected within the ITU channel grid and the gain band of an erbium doped fiber amplifier (1530–1570 nm), the broad transmission band centered around $\lambda_1$ would shift from 1310 nm proportionally with $\Delta$, the difference between $\lambda_0$ and 1550 nm. The broad transmission band centered around $\lambda_1$ (for example, 1310 nm) can be maintained for different values of $\lambda_0$, if the high transmission region in the pass band of the multilayer dielectric mirror is greater than 20 nm, which is sufficient to provide the dual band characteristics for a fixed pair of $\lambda_0$ and $\lambda_1$.

Figure 1:
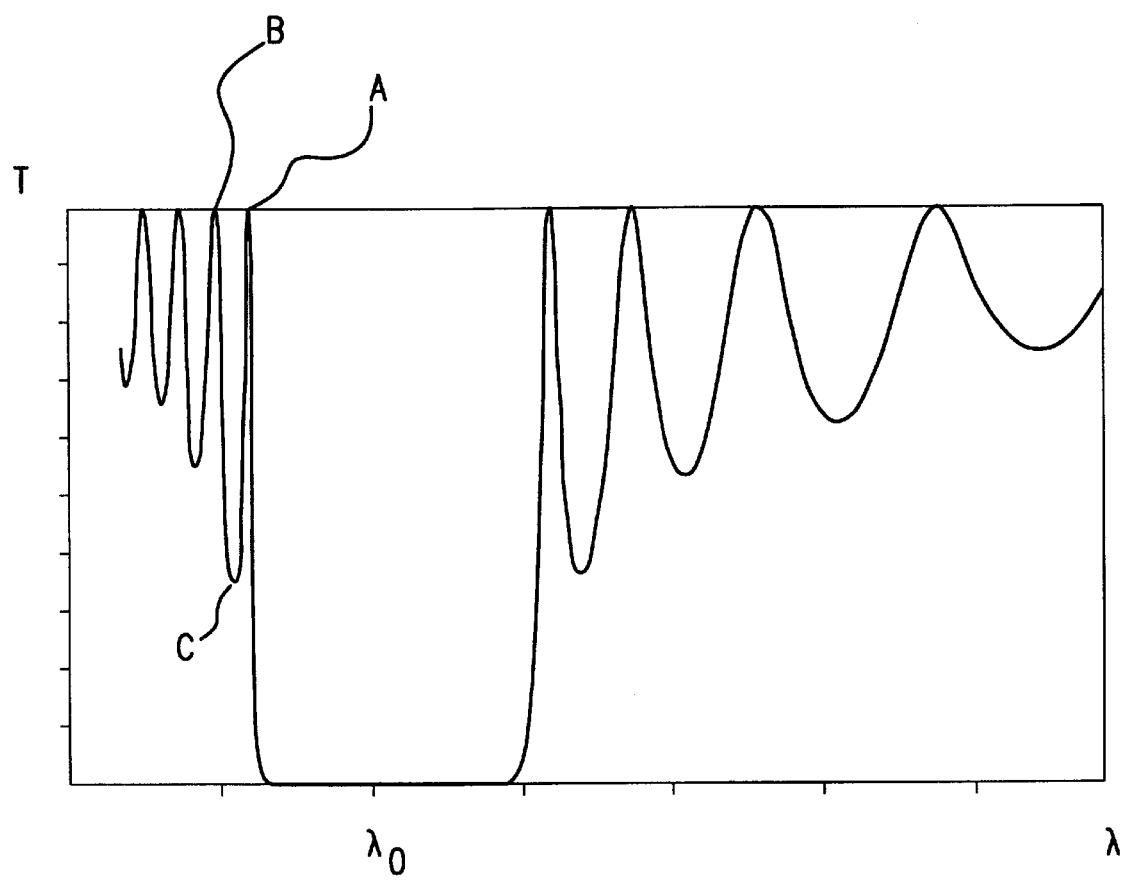
FIG. 1 illustrate a transmission spectrum of a conventional mirror including a plurality of dielectric layers.
Figure 2:
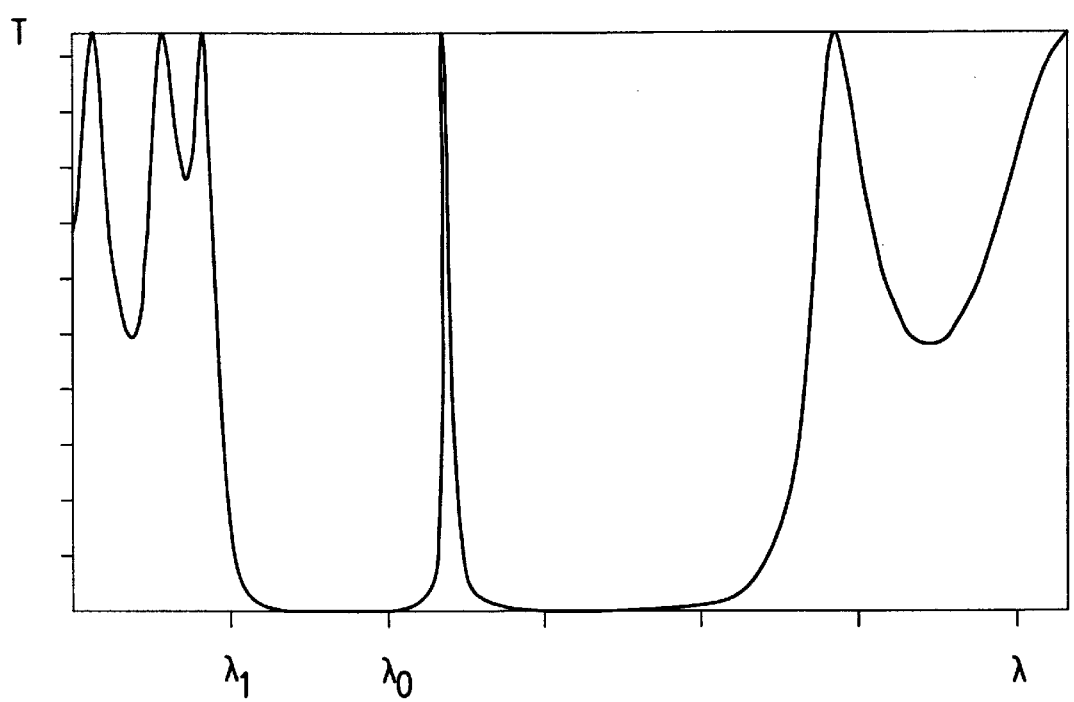
FIG. 2 illustrates a transmission spectrum of a single cavity filter including conventional mirrors.
Figures 5, 6:
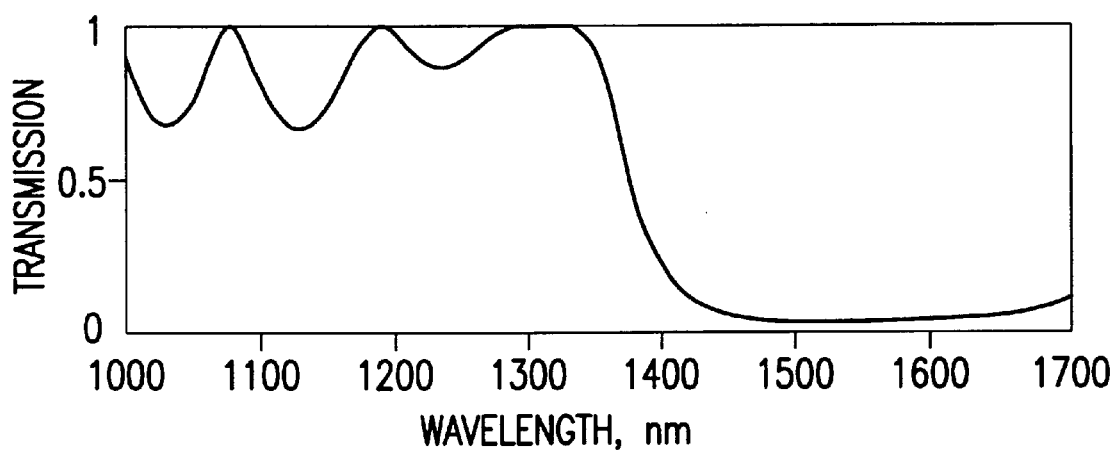
FIG. 5 illustrates schematically a mirror having q dielectric layers of alternating high and low refractive indices.
FIG. 6 illustrates a transmission characteristic associated with the mirror shown in FIG. 5.

The high transmission band around wavelength $\lambda_1$ associated with the mirror shown in FIG. 1 can be broadened by collapsing the adjacent transmission peaks A and B and eliminating low transmission point C. This is achieved by depositing a dielectric material having a refractive index $n_{H1} \approx 1.55$–1.58 for the third layer as well as for the q-2 layer in the mirror. For example, FIG. 5 illustrates a mirror having q dielectric layers of alternating high (H) and low (L) refractive indices. The third layer and the q-2 layer have an associated refractive index of ≈1.55–1.58. FIG. 6 illustrates a transmission characteristic associated with this mirror structure resulting in a broader transmission band around wavelength $\lambda_1$ (≈1310 nm).

Figure 7:
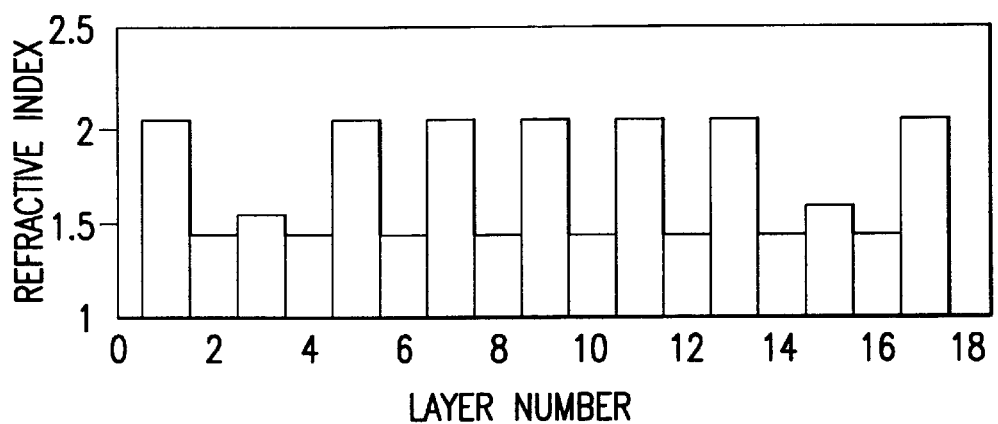
FIG. 7 illustrates the refractive index of each of the layers of an exemplary mirror utilizing the structure described in FIG. 5.

FIG. 7 graphically illustrates the refractive index of each of 17 layers (q=17) of an exemplary mirror utilizing the structure described with reference to FIGS. 5 and 6. Ta$_2$O$_5$ ($n_H \approx 2.05$) was selected as the high refractive index material for layers 1, 5, 7, 9, 11, 13 and 17. SiO$_2$ ($n_H 1.44$) was selected as the low refractive index material for layers 2, 4, 6, 8, 10, 12, 14 and 16. Layers 3 and 15 have refractive index $n_H = 1.58$. Layers 3 and 15 may be deposited either by a properly ratioed co-deposition of high and low index materials, or by depositing materials having a refractive index of 1.58 (e.g., mullite, which is a mixture of 76–80% of Al$_2$O$_3$ and 20–24% of SiO$_2$).

Figure 8:
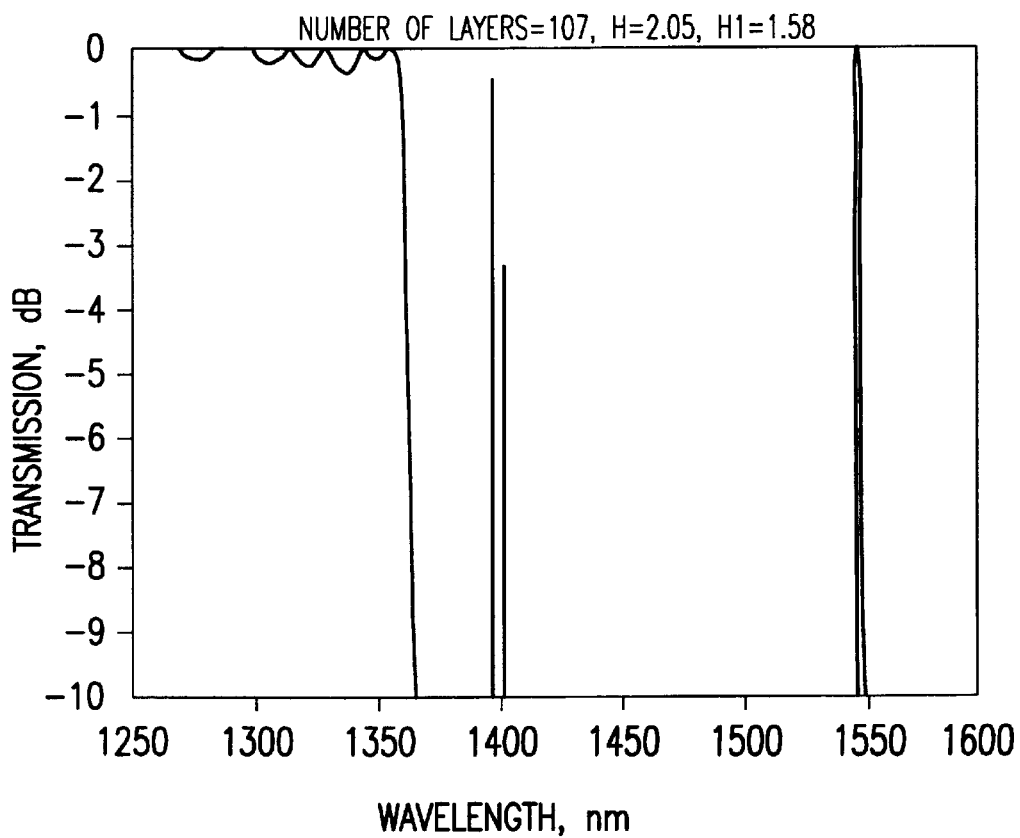
FIG. 8 illustrates a transmission characteristic of a three cavity filter consistent with the pent invention.

A three cavity interference filter having the structure described with reference to FIG. 3(c) where each mirror (102, 103, 111, 113, 118 and 120) is formed using the structure described in FIGS. 5–7. A transmission characteristic associated with this three cavity filter is shown in FIG. 8. As can be seen, the 100 nm broad transmission band around wavelength $\lambda_1$ (≈1310 nm) allows a choice of wavelengths $\lambda_0$ within the gain band of a typical erbium doped fiber amplifier (1520 nm–1570 nm) without sacrificing transmission around wavelength $\lambda_1$.

Figure 9:
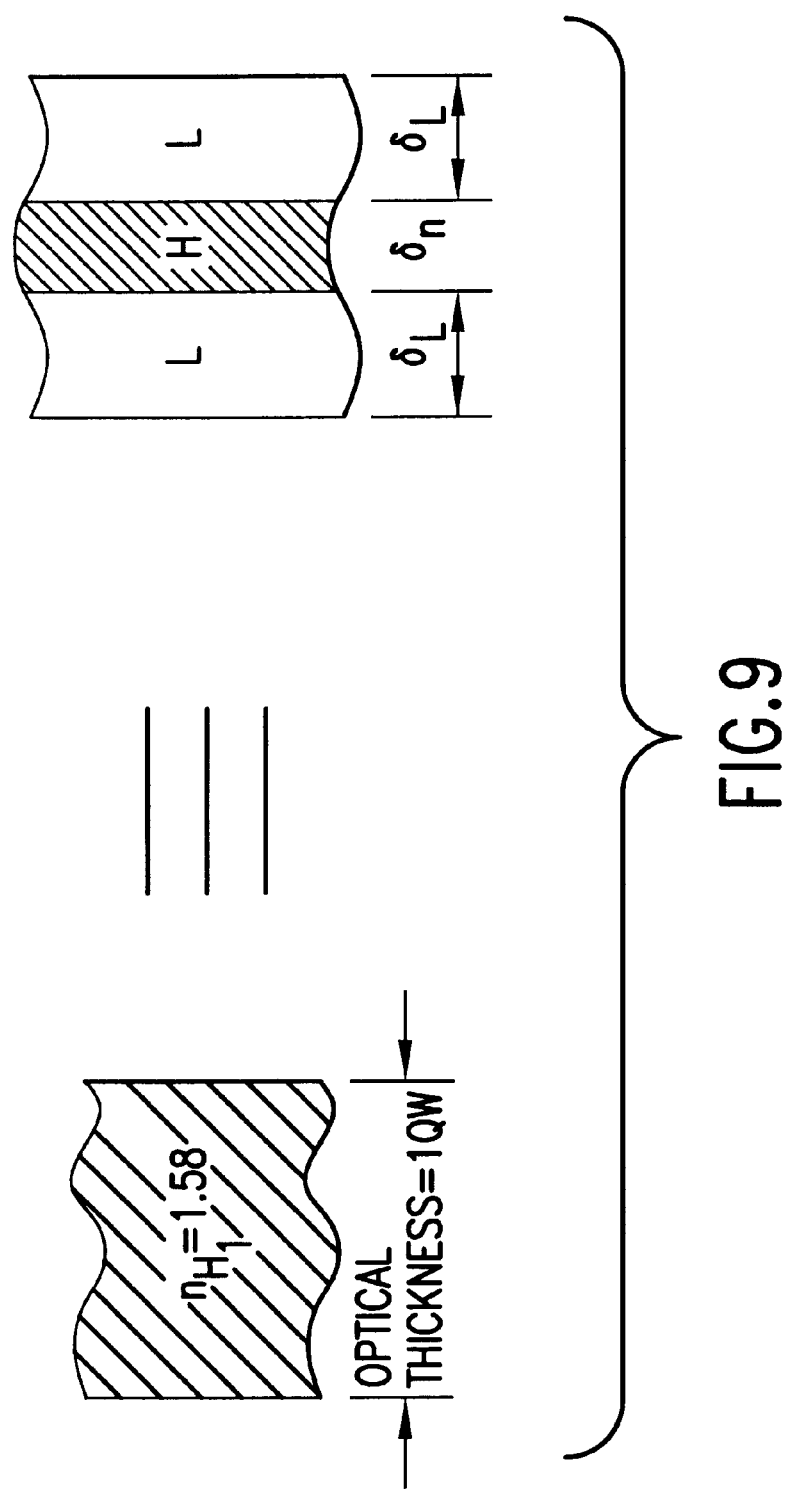
FIG. 9 a composite dielectric layer consistent with an aspect of the present invention.

The interference filter described above calls for the deposition of a third material having an intermediate refractive index value in the range of 1.55–1.58 with respect to the high and low refractive index materials forming each mirror. However, the introduction of this third material into the deposition process is less desirable from a manufacturing perspective. Accordingly, the third material having an intermediate refractive index used to form layers 3 and q-2 (e.g. layers 3 and 15 referenced in FIG. 7) of an exemplary mirror can be formed by a symmetrical composite consisting of a layer of high index material (e.g., Ta$_2$O$_5$, $n_H \approx 2.05$) clad by a pair of low index material layers (e.g., SiO$_2$, $n_L \approx 1.44$) as schematically shown in FIG. 9. This composite material has an optical thickness of one quarter wave at $\lambda_0$, and its effective refractive index is 1.58. If $\delta_H$ represents the optical thickness (in quarter waves at $\lambda_0$) of the thin high index layer comprising the composite, the optical thicknesses $\delta_L$ of the low index material can be calculated as follows:

$$\delta_L = \frac{1}{\pi} \operatorname{atan}\left( \frac{2 n_H \cdot n_L}{(n_H^2 + n_L^2) \tan\left(\frac{\pi \cdot \delta_H}{2}\right)} \right) \quad (3)$$

The resulting structure has an optical thickness of one quarter wave at $\lambda_0$ and allows the use of turning point monitoring for quarter waves during layer deposition.

Figure 10A:
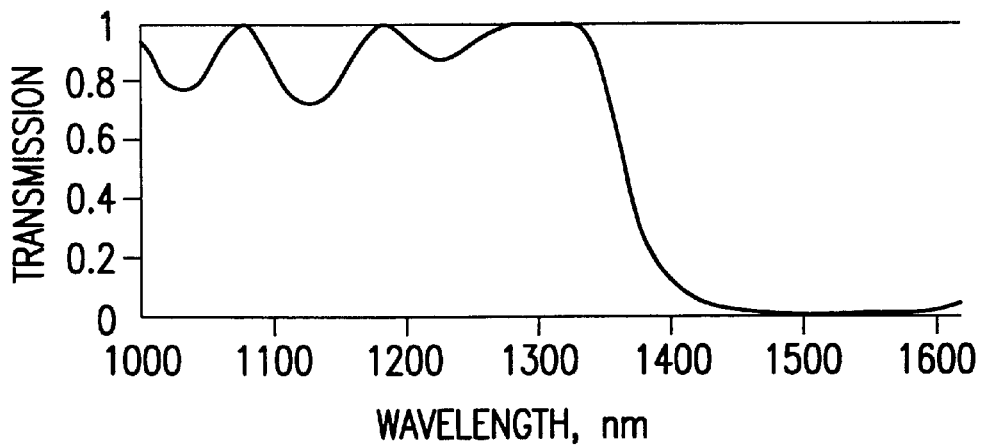
FIGS. 10(a) and 10(b) illustrates a transmission characteristic and structure, respectively, of a two-material mirror consistent with an aspect of the present invention.

FIGS. 10(*a*) and 10(*b*) show a transmission characteristic and the structure, respectively, of the two-material mirror with essentially identical characteristics to a three material mirror design (FIGS. 6–7). In this example, $\delta_H$=0.14 and $\delta_L$=0.4257. It should be noted, that the cladding layers of FIG. 9 with optical thicknesses of 0.4257 ($\lambda/4$) joining the one $\lambda/4$ thick low index material layers surrounding the original layer with intermediate refractive index $n_{H1}$=1.58, forms low index layers of 1.4257 $\lambda/4$ optical thickness at $\lambda_0$.

Figure 11:
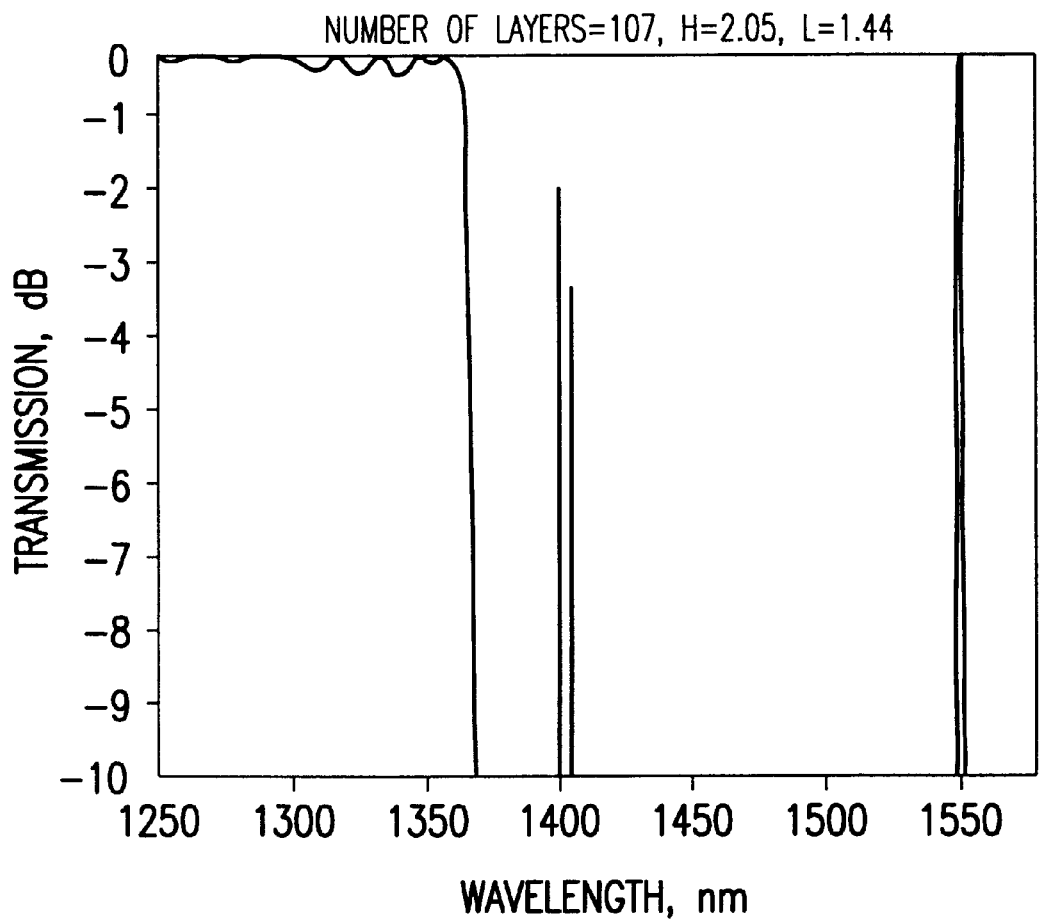
FIG. 11 illustrates a transmission characteristic of a three-cavity filter using the mirror shown in FIG. 10(b).

FIG. 11 illustrates a transmission characteristic of a three cavity filter using the two-material mirror structure described above. As can be seen, the broad transmission band around wavelength, ($\approx$1310 nm) allows a choice of wavelengths $\lambda_0$ within the gain band of a typical erbium doped fiber amplifier (1520 nm–1570 nm) without sacrificing transmission around wavelength $\lambda_1$.

Figure 10B:
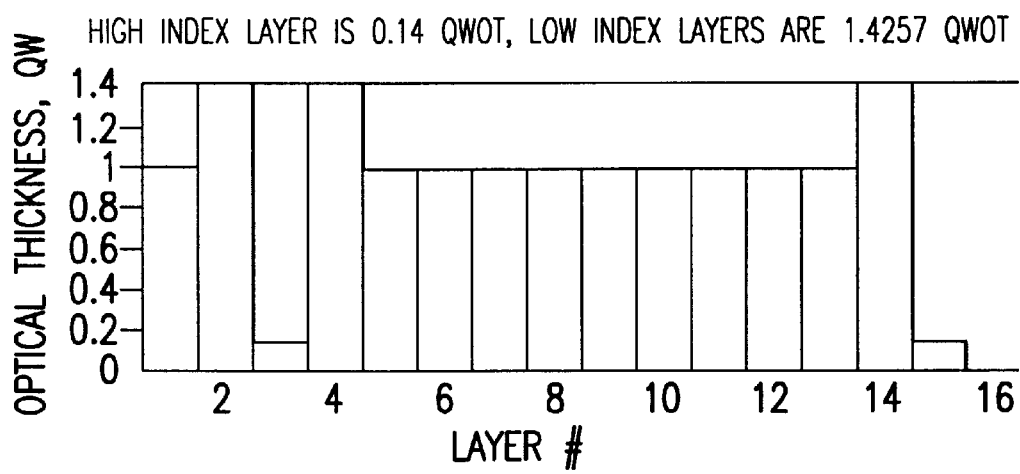

Consistent with a further aspect of the present invention, the third layer shown in FIG. 10*b* can be eliminated and the optical thickness of both the second and fourth layers can be increased to have an optical thickness of 1.5 times a quarter wavelength to form a single continuous layer having an optical thickness of ¾ a quarter wavelength. Likewise, the q-2 layer can be eliminated and the optical thickness of the q-1 and q-3 layers can be increased to have an optical thickness of 1.5 times a quarter wavelength to form a single continuous layer also having an optical thickness of ¾ a quarter wavelength.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical filter, comprising:
   a first mirror layer;
   a second mirror layer; and
   a spacer layer provided between said first mirror layer and said second mirror layer; said filter having a transmission spectrum, a first portion and a second portion, said second portion having a peak transmissivity of substantially 100% at a wavelength substantially equal to 1550 nm, and said first portion of said transmission spectrum having a transmissivity of substantially 100% over q band of wavelengths including 1310 nm.

2. An optical filter in accordance with claim 1, wherein said first mirror layer includes a plurality of dielectric layers.

3. An optical filter in accordance with claim 1, wherein a first wavelength ($\lambda_0$) lies within said first portion of said transmission spectrum, and a second wavelength ($\lambda_1$) lies within said second portion of said transmission spectrum, said first mirror comprising:
   alternating first and second dielectric layers, each said first dielectric layers having a first refractive index ($n_H(\lambda_1)$), and each said second dielectric layers having a second refractive index ($n_L(\lambda_1)$), said first refractive index being greater than said second refractive index, said first and second refractive indices satisfying the following formula:

$$\frac{n_H(\lambda_1)}{n_L(\lambda_1)} = \frac{1+r}{1-r}$$

where r satisfies the following formula:

$$r = \sqrt{1 - \left(\frac{\sin\left(\frac{\pi}{2}\frac{\lambda_0}{\lambda_1}\right)}{\sin\left(\frac{\pi}{2}\frac{(q-1)}{(q+1)}\right)}\right)^2}$$

where q is a sum of the number of said first and second dielectric layers.

4. An optical filter in accordance with claim 2, wherein said plurality of dielectric layers includes a first plurality of layers and a second plurality of layers, each said first plurality of layers including $SiO_2$ and each said second plurality of layers including $Ta_2O_5$.

5. An optical filter in accordance with claim 1, wherein said second portion of said transmission spectrum having a bandwidth of at least 50 nm.

6. An optical filter in accordance with claim 1, wherein said first mirror includes q dielectric layers, where q is an integer at least equal to 7, each of a first plurality of said q dielectric layers having a first refractive index and each of a second plurality of said q dielectric layers having a second refractive index, said first refractive index being greater than said second refractive index, each of a third plurality of said q dielectric layers having a third refractive index intermediate between said first and second refractive indices.

7. An optical filter in accordance with claim 6, wherein said q dielectric layers constitute a stack of layers having a first outermost layer and a second outermost layer, a first one of said third plurality of q dielectric layers being spaced from said first outermost layer by a first intermediate one of said q dielectric layers, and a second one of said third plurality of said q dielectric layers being spaced from said second outermost layer by a second intermediate one of said q dielectric layers.

8. An optical filter in accordance with claim 6, wherein said first one of said third plurality of said q dielectric layers is a substantially homogenous layer.

9. An optical filter in accordance with claim 6, wherein said first one of said third plurality of said q dielectric layers includes a plurality of dielectric layers collectively having a refractive index substantially equal to said third refractive index.

10. An optical filter in accordance with claim 9, wherein at least a first one of said plurality of dielectric layers within said first one of said third plurality of said q dielectric layers includes a material identical to that of said first plurality of q dielectric layers, and a second one of said plurality of dielectric layers within said first one of said third plurality of said q dielectric layers includes a material identical to that of said second plurality of q dielectric layers.

11. An optical filter in accordance with claim 6, wherein said first plurality of said q dielectric layers each includes $SiO_2$, and each said second plurality of said q dielectric layers includes $Ta_2O_5$.

12. An optical filter in accordance with claim 1, wherein a wavelength lies within said first portion of said transmission spectrum, said first mirror includes q dielectric layers, said q dielectric layers constitute a stack of layers having a first outermost layer and a second outermost layer, a first one of said q dielectric layers adjacent said first outermost layer having an optical thickness substantially equal to ¾ times said wavelength, and a second one of said q dielectric layers adjacent said second outermost layer having an optical thickness substantially equal to ¾ times said wavelength.

13. An optical filter in accordance with claim 1, wherein said first bandwidth has a magnitude of about 1 nm and said second bandwidth has a magnitude of at least 20 nm.

14. An optical filter in accordance with claim 1, wherein a wavelength within said first bandwidth has a value greater than a value of a wavelength within said second bandwidth.

15. An optical filter in accordance with claim 6, wherein said first refractive index is substantially equal to 2.05, said second refractive index is substantially equal to 1.44 and said third refractive index is substantially equal to 1.58.

* * * * *